United States Patent [19]

Kawakami

[11] Patent Number: 4,769,532

[45] Date of Patent: Sep. 6, 1988

[54] APPARATUS FOR ADJUSTING OPTICAL SENSORS WITH THRESHOLD MEMORY

[75] Inventor: Moriatsu Kawakami, Zushi, Japan

[73] Assignee: Laurel Bank Machines Co., Ltd., Tokyo, Japan

[21] Appl. No.: 70,046

[22] Filed: Jul. 6, 1987

[30] Foreign Application Priority Data

Jul. 11, 1986 [JP] Japan ............................ 61-106486[U]
Jul. 17, 1986 [JP] Japan ............................ 61-109949[U]
Jul. 23, 1986 [JP] Japan ............................ 61-113214[U]

[51] Int. Cl.$^4$ ................................................ G01J 1/20
[52] U.S. Cl. ...................................... 250/205; 307/311
[58] Field of Search ................. 250/205, 571; 307/311

[56] References Cited

U.S. PATENT DOCUMENTS 3,996,475 12/1976 Rodriguez ............................ 307/311
4,065,669 12/1977 Bogel .................................. 307/311
4,324,981 4/1982 Miller ................................. 307/311

Primary Examiner—David C. Nelms
Assistant Examiner—Stephone B. Allen
Attorney, Agent, or Firm—Fleit, Jacobson, Cohn & Price

[57] ABSTRACT

A device for adjusting optical sensors in which light from a light emitting element is detected by a light receiving element to determine whether the output level of said light receiving element exceeds a certain threshold. The present device is used for adjusting the optical sensors used, for example, in an automatic cash receiving and dispensing machine and the like and enables accurate operation the bill and/or coin handling machines to continue to operate reliably despite changes with the time of the optical sensors and the deposit of dust on the sensors, by constantly comparing the light reception level with a predetermined threshold and utilizing the optimum threshold.

3 Claims, 9 Drawing Sheets

FIG.3

- S1: START OF ADJUSTING MODE
- S2: SELECTION OF R1 TO "BRIGHT"
- S3: MEMORY OF LIGHT RECEPTION LEVEL L1 OF R2
- S4: SELECTION OF R2 TO "DARK"
- S5: MEMORY OF LIGHT RECEPTION LEVEL L2 OF R2
- S6: CHECK OF LOWER MOST LEVEL OF L1 AND L2
- S7: ABNORMAL → ALARM
- S8: NORMAL → DETERMINATION OF JUDGING LEVEL $Lc = \dfrac{L1 + L2}{2}$
- S9: SELECTION OF R1 TO "BRIGHT"
- S10: COMPLETION OF ADJUSTMENT "NORMAL" OR REPEAT OF PROCESS

APPARATUS FOR ADJUSTING OPTICAL SENSORS WITH THRESHOLD MEMORY

BACKGROUND OF THE INVENTION

The present invention relates to optical sonsors used, for example, in an automatic cash receiving and dispensing machine and more particularly to a level adjusting device for the optical sensors used in discriminating the bills.

Usually an automatic cash receiving and dispensing machine used in a bank is provided with optical sensors for discriminating whether a bill is genuine by detecting the presence or absence of a bill in a particular section in the machine, the length of the bill, and the optical transmission pattern or optical reflecting pattern of the bill.

A prior art of such a discriminating device is disclosed in Japanese Laid-Open Patent Publication No. 6597/1976 (hereinafter referred to as "prior document"). In this discrimination device, an analogue detecting signal (for example, the wave-shaped signal shown in FIG. 2 of the prior document) from a photodetecting element such as a phototransistor is compared with a predetemined threshold, and when the analogue detecting signal exceeds the threshold an "H (high)" level signal is obtained and when it is less than the threshold an "L (low)" level signal is obtained and the resultant digital signals are utilized for a subsequent process.

However, in optical sensors which utilize phototransistors and the like, the detected level sometimes varies because of a change with time in the characteristics of the light emitting and receiving elements, deviation in voltage of the power source, and deviation in the detecting level due to a deposit of dust on the sensors. Accordingly, to prevent malfunction of the device, it is required to adjust the amount of light emmission of the light emitting element, or sensitivity of the light receiving element or the threshold, or to remove the dust from the sensors.

The automatic cash receiving and dispensing machine for use in a bank is also provided with an optical sensor intended to discriminate between the presence or absence of a bill and passage of a bill in a particular section in the machine. In general, the presence or absence of a bill is determined by detecting the output level of a light receiving element (e.g. a phototransistor) receiving the light emitted from a light emitting element (light source) and by confirming whether the output level exceeds a reference value (hereinafter referred to as the "threshold").

However, in an optical sensor utilizing the phototransistor etc., the detected level sometimes varies because of a change with time in the characteristics of the light emitting and receiving elements, deviation in voltage of the power source, and deviation in the detecting level due to the deposit of dust on the sensors. Accordingly, it is often required to adjust the sensors or to remove the dust therefrom in response to the level deviations.

A prior art means for compensating for the level deviations of the optical sensors is disclosed in Japanese Utility Model Application No. 157698/1984 (Japaneses Laid-Open Utility Model Publication No. 72689/1986) which was filed by the present applicant under the title "Device for controlling optical sensors". In this device, a dummy set of optical sensors is arranged at a position which is not a part of the transport path of the object (e.g. a bill) to be detected and the change with time in the light receiving characteristics is compensated for by adjusting the threshold in response to the variation of the light receiving characteristics of the dummy set of optical sensors.

However, since the device of the prior art is gaged on the premise that the dummy optical sensors change with time under the same conditions as those to be compensated, it is occasionally impossible to surely carry out the compensational operation owing to differences in the characteristics of the optical sensors or differences in the amount of dust.

SUMMARY OF THE INVENTION

An object of the present invention is to provide a detecting device which is able to always maintain accuracy of operation without any manual adjustment or maintenance such as of dust removal.

According to the present invention, there is provided a device for adjusting optical sensors in which light from a light emitting element is detected by a light receiving element to determine whether the output level of the light receiving element exceeds a threshold comprising: a controlling means for changing an amount of light emission of said light emitting element; a control signal generating means for supplying said light emission amount controlling means with a plurality of control signals for changing the light emission level of said light emitting element; a reference level memorizing means for storing the output signal from said light receiving element each time each of the plurality of control signals supplied is output; and a comparative level computing and memorizing means for computing a comparative level from the plural output signals memorized in said reference level memorizing means and memorizing the comparative level as a threshold of said light receiving element.

Also according to the present invention, there is provided a device for adjusting optical sensors in which light from a light emitting element is detected by a light receiving element to determine whether the output level of said light receiving element exceeds a threshold comprising: a controlling means for changing an amount of light emission of said ligh emitting element; a control signal generating means for supplying said light emission amount controlling means with a plurality of control signals for changing the light emission level of said light emitting element; a light receiving element for detecting the light emitted from said light emitting element and converting it to an electric signal, an amplifier for amplifying the output signal of said light receiving element, an amplifier controlling means for controlling the amplification factor of said amplifier, an amplification factor determining means for computing a relative relation between the signals output from said amplifier and controlling said amplifier controlling means in order to have the result of the computation conform with a reference value when the plurality of control signals are output from said control signal generating means.

Furthermore, according to the present invention, there is also provided a device for adjusting optical sensors in which light from a light emitting element is detected by a light receiving element to determine whether the output level of said light receiving element exceeds a threshold comprising: a light emission amount controlling means for switching the amount of light emission of said light emitting element to either a "bright" mode or a "dark" mode; a control signal generating means for supplying said light emission amount controlling means with a signal for switching said light emission amount controlling means to either the "bright" mode or the "dark" mode; a means for detecting a decreased level condition of the light receiving element and outputting an alarm signal when the light reception level in compared with the reference value and the light reception level of the light receiving element is less than a reference level as while the light emitting element is emitting light in the "dark" mode condition; said light emission amount in the "dark" mode condition being so set that said light receiving element can output in a non-interrupted condition a light reception level exceeding said threshold; said reference level in said low-level detevting means being made to conform to said threshold.

BRIEF DESCRIPTION ON THE DRAWINGS

Other objects and advantages of the present invention will become apparent from the following detailed description of preferred embodiments of the present invention taken in reference to the accompanying drawings in which:

FIG. 3 is a flow chart showing an adjusting operation of the apparatus of FIG. 1;

DESCRIPTION OF THE PREFERRED EMBODIMENTS

Firstly, the first preferred embodiment of the present invention will be explained with reference to FIGS. 1 to 3.

Figure 1:
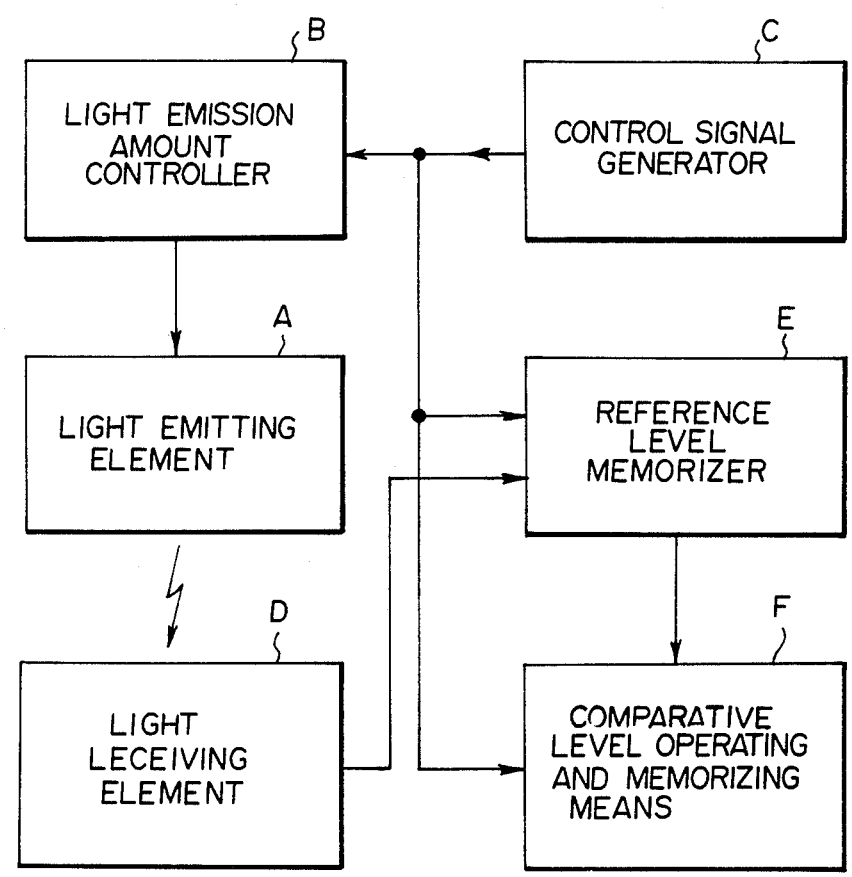
FIG. 1 is a block diagram showing a function of the apparatus according to a first preferred embodiment of the present invention.

In FIG. 1, a detector for paper and the like of the present invention in which light from a light emitting element A is detected by a light receiving element D to determine whether the output level of said light receiving element D exceeds a threshold comprises: a light emission amount controller B for changing a light emission level of said light emitting element A; a control signal generator C for supplying said light emission amount controller B with a plurality of control signals each of which triggers a change in the light emission level of said light emitting element A; a reference level memory E for storing the output signals from said light receiving element D each time each of the plurality of control signals supplied from said control signal generator C is output, and, a comparative level computing and memorizing means F for computing a comparative level from the plurality of output signals memorized in said reference level memory E and for memorizing the comparative level as a threshold of said light receiving element D.

It is possible to adjust the light emission amount of the light emitting element A by operating the light emission amount controller B in accordance with the output signal from the control signal generator C. It is also possible to obtain a threshold corresponding to the deviations in the light emitting and receiving elements by switching the light emission amount, for example, to an amount respectively corresponding to a non-interrupted condition and an interrupted condition and also by carrying out a predetermined computation process with respect to the detected light reception levels of two kinds with the light reception level of the light receiving element detected for each of the light emission amounts.

Figure 2:
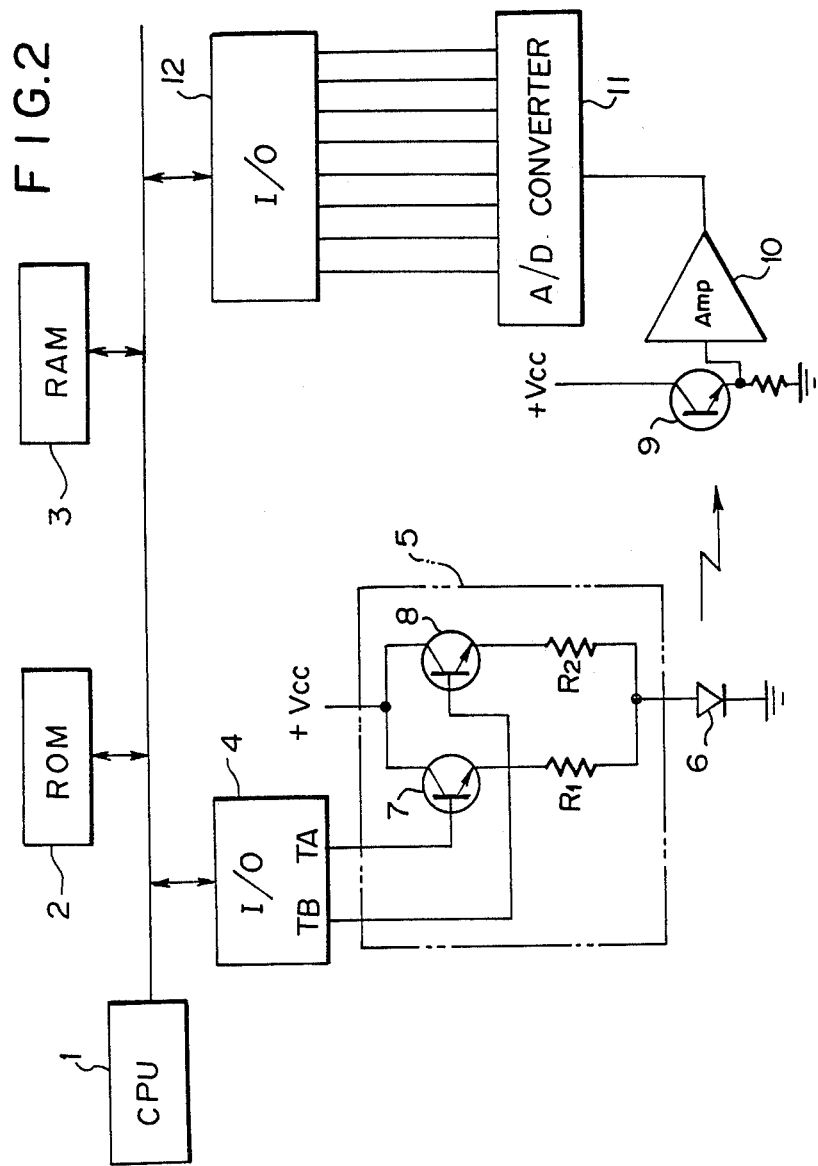
FIG. 2 is a block diagram showing a structure of the apparatus of FIG. 1.

With reference to FIGS. 2 and 3, a numeral 1 denotes a CPU (central processing unit) for controlling a bill discrimination device and the like to which a ROM (read-only memory) 1 and RAM (random-access memory) 3 are connected. A light emission amount control circuit 5 is connected to the CPU 1 through an I/O (input/output) port 4 and a light emitting element, i.e. a light emitting diode 6, is connected to the light emission amount controlling circuit 5.

The light emission amount control circuit 5 consists of a control transistor 7 triggered by an "A" signal output from the I/O port 4 and a control transistor 8 triggered by a "B" signal are arranged in parallel. The control transistors 7 and 8 are connected to the light emitting diode 6 via resistors $R_1$ and $R_2$ respectively. The value of the resistor $R_1$ is set at such a level that the output level of the phototransistor 9 is such part the light-emitting diode 6 emits an amount of light in the "bright" mode which is equivalent to the light being detected directly (i.e. in the non-interrupted condition). On the other hand, the value of the resistor $R_2$ is set at such a level that the output level from the phototransistor 9 is such that the light-emitting diode 6 emits an amount of light in the "dark" mode which is equivalent to the incident light on the phototransistor 9 reduced by the interposing of a bill or the like (i.e. in the interrupted condition).

The phototransistor 9 is arranged at a position where it can receive the light emitted from the light emitting diode 6. The output of the phototransistor 9 is input to an A/D converter (analogue digital converter) 11 via an amplifier 10 and converted to an "H" digital signal representing the non-interrupted condition or an "L" digital signal representing the interrupted condition. Then, the output of the A/D converter 11 is input to the CPU 1 via the I/O port 12.

The operation of the circuit in FIG. 2 will now be explained with reference to the flow chart of FIG. 3. These, explanations, S n denotes the nth step in the flow chart.

S 1: The adjusting operation is started by energizing (switching on the power source of) the bill receiving and discharging machine on which the optical sensors are provided.

S 2: The light emitting diode 6 is connected to a power source Vcc through the resistor $R_1$ by inputting the trigger signal TA to the base of the control transistor 7 and emits the light in "bright" condition which is then detected by the phototransistor 9.

S 3: The light reception level (output voltage) $L_1$ of the phototransistor 9 in "bright" condition is stored in the RAM 3.

S 4: The light emitting diode 6 is connected to the power source Vcc via the resistor $R_2$ by inputting the control signal TB to the base of the controlling transistor 7 and emits the light in "dark" condition which is then detected by the phototransistor 9.

S 5: The light reception level $L_2$ of the phototransistor 9 in "dark" condition is stored by the RAM 3.

S 6: The values $L_1$ and $L_2$ are read out from the RAM 3 and input to the CPU 1, and the lowermost of these values $L_1$ and $L_2$ are compared with respective reference values. As the result, when the values $L_1$ and $L_2$ of the light reception level are less than the reference values for some reason, for example, dust or change with time of the sensors, etc., an alarm is given to indicate that a problem might have arisen (S 7). If operation is determined to be normal, the procedure advances to the following step.

S 8: With respect to the detected data $L_1$ and $L_2$, $$Lc=(L_1+L_2)/2$$

is computed and the resultant value Lc is stored in the CPU 1 as a threshold in subsequent A/D conversion.

S 9: "Bright" condition is selected by connecting the light emitting diode 6 to the power source Vcc via the resistor $R_1$ with the control signal TA again output.

S 10: The adjusting operation is completed and a ready condition is assumed for discrimination of the bills.

A detailed explanation of the discrimination operation is omitted herein since it does not directly relate to the gist of the present invention. However, it can be easily understood that many kinds of discriminating operations such as on whether a bill has or a bill watermark has passed can be carried out by having the light emitting diode 6 emit light in the "bright" condition and also by utilizing the value of $L_2$ obtained at the step S 8 as a threshold.

Additionally, the conditions for commencing the adjusting operation is not limited to the method of energizing the bill handling machine as shown in the first preferred embodiment; it is possible to perform adjustment by operating switches provided on an operation panel to provide adjusting operation instruments or a method of which utilizes a timer or the like to carry out adjustment at predetermined intervals.

A second preferred embodiment of the present invention will now be explained with reference FIGS. 4 through 6.

Figure 4:
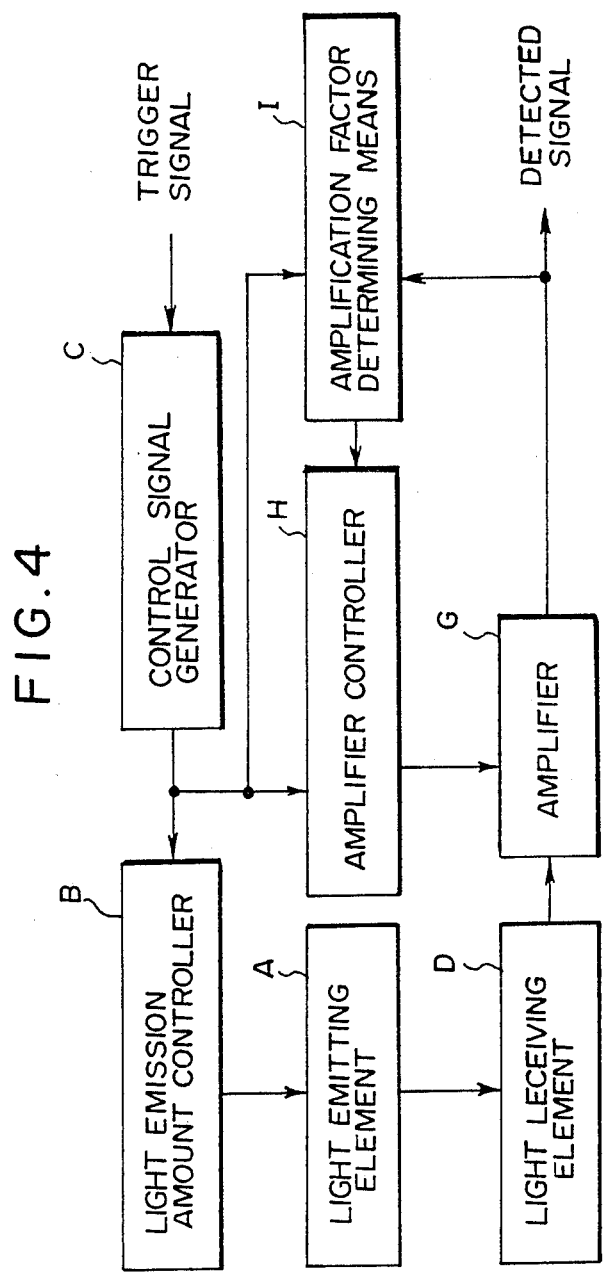
FIG. 4 is a block diagram showing a function of the apparatus according to a second preferred embodiment of the present invention.

In FIG. 4, an optical sensor in which light from a light emitting element A is detected by a light receiving element D and amplified by an amplifier G and it is determined whether the output signal level of said amplifier G exceeds a threshold comprises: a light emission amount controller B for changing a light emission level of said light emitting element A and increasing or decreasing it in a plurality of steps; a control signal generator C for supplying said light emission amount controller B with a plurality of control signals each of which triggers a change in the light emission level of said light emitting element A; a light receiving element D for detecting the light emitted from said light emitting element A each time are of the plurality of control signal is supplied from said control signal generator C; an amplifier G for amplifying an output signal of said light receiving element D; an amplifier controller H for controlling the amplification factor of said amplifier G; an amplification factor determining means I for computing the relative difference of the signals output from said amplifier G and controlling said amplifier controller H so that the result of the computation conforms to a reference value every time one of the plurality of control signals is output from said control signal generator C.

It is possible to adjust the light emission amount of the light emitting element A by operating the light emission amount controller B in accordance with the output signal from the control signal generator C. It is also possible to keep a threshold constant notwithstanding a change in the characteristics of the light emitting and receiving elements by switching the light emission amount, for example, to an amount respectively corresponding to a non-interrupted condition and an interrupted condition and also by finding the difference in the output signals of the amplifier for each of the two light emission amounts and then changing the difference in order to make it conform to the reference value.

Figure 5:
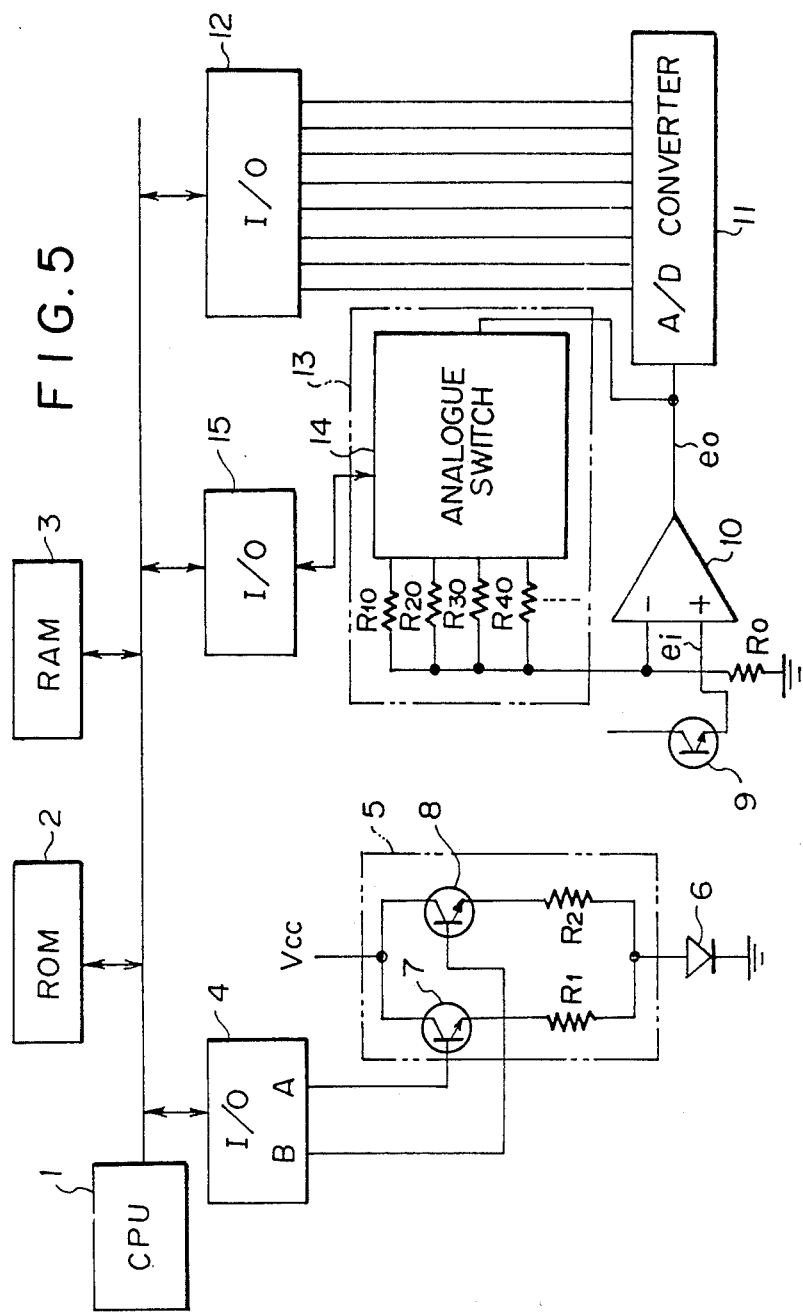
FIG. 5 is a block diagram showing a structure of the apparatus of FIG. 4.
Figure 6:
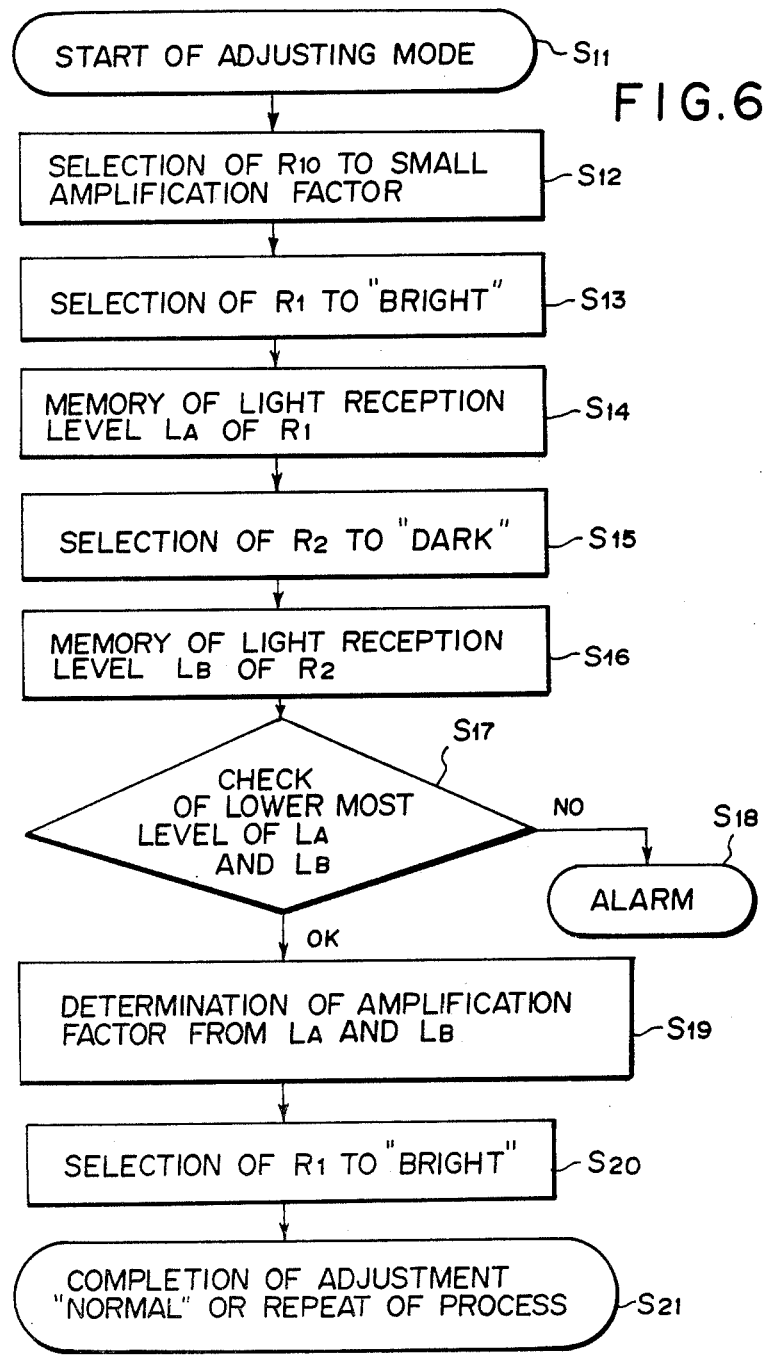
FIG. 6 is a flow chart showing an adjusting operation of the apparatus of FIG. 4.

With reference to FIGS. 5 and 6, 1 is the CPU for controlling a bill discriminating apparatus to which a ROM 2 and a RAM 3 are connected. A light emission amount control circuit 5 is connected to the CPU 1 through an I/O port 4 and a light emitting element, i.e. a light emitting diode 6, is connected to the light emission amount controlling circuit 5.

The light emission amount control circuit 5 consists of a control transistor 7 triggered by an "A" signal output from the I/O port 4 and a control transistor 8 triggered by a "B" signal are arranged in parallel. The control transistors 7 and 8 are connected to the light emitting diode 6 via resistors $R_1$ and $R_2$ respectively.

The value of the resistor $R_1$ is set at such a level that the output level of the phototransistor 9 is such part the light-emitting diode 6 emits an amount of hight in the "bright" mode which is equivalent to the light being detected directly (i.e. in the non-interrupted condition). On the other hand, the value of the resistor $R_2$ is set at such a level that the output level from the phototransistor 9 is such that the light-emitting diode 6 emits an amount of light in the "dark" mode which is equivalent to the incident light on the phototransistor 9 reduced by the interposing of a bill or the like (i.e. in the interrupted condition).

The phototransistor 9 is arranged at a position where it can receive the light emitted from the light emitting diode 6. The output of the phototransistor 9 is input to an A/D converter (analogue digital converter) 11 via an amplifier 10 and converted to an "H" digital signal representing the non-interrupted condition or an "L" digital signal representing the interrupted condition. Then, the output of the A/D converter 11 is input to the CPU 1 via the I/O port 12.

An amplifier control circuit 13 for controlling the degree of negative feedback of the amplifier 10 to control the amplification factor thereof is connected to an output terminal and a negative input terminal of the amplifier 10. The amplifier control circuit 13 includes a plurality of resistors $R_{10}$ to $R_{n0}$ and an analogue switch 14 for selectively connecting any one of the resistors $R_{10}$ to $R_{n0}$ to the negative feedback circuit. The analogue switch 14 is connected to the CPU 1 through an I/O port 15. The resistance of each of the resistors $R_{10}$ to $R_{n0}$ increases sequantially from the first so that the amplification factor is smallest when the negative feedback circuit is formed through the resistor $R_{10}$ and longest when the circuit is formed with the resistor $R_{n0}$.

That is, the output voltage $e_0$ can be shown as $$\{e_0=(R_0+R_{n0})/R_0\}\cdot e_i$$

where $R_0$ is the value of the resistance connected between the input side and ground, and, $e_i$ is the input voltage.

From which, it can be understood that an increase in the resistance from $R_{10}$ to $R_{n0}$ results in an increase of the output level of the amplifier 10.

The operation of the circuit of FIG. 5 will now be explained with reference to the flow chart of FIG. 6. In these explanations, S n denotes the nth step in the flow chart.

S 11: The adjusting operation is started by energizing (switching on the power source of) the bill receiving and discharging machine and the like on which the optical sensors are provided.

S 12: The amplification factor of the amplifier 10 is set to the minimum by connecting the resistor $R_{10}$ to the negative feedback circuit.

S 13: The light emitting diode 6 is connected to a power source Vcc through the resistor $R_1$ by inputting the trigger signal TA to the base of the control transistor 7 and emits the light in "bright" condition which is then detected by the phototransistor 9.

S 14: The output voltage $L_A$ of the amplifier 10 in "bright" condition is stored in the RAM 3.

S 15: The light emitting diode 6 is connected to the power source Vcc via the resistor $R_2$ by inputting the control signal TB to the base of the controlling transistor 7 and emits the light in "dark" condition which is then detected by the photo transistor 9.

S 16: The output voltage $L_B$ of the amplifier 10 in "dark" condition is stored in the RAM 3.

S 17: The values $L_A$ and $L_B$ are read out from the RAM 3 and input to the CPU 1, and the lowermost level of these values $L_A$ and $L_B$ are compared with respective reference values. As the result, when the values $L_A$ and $L_B$ of the light reception level are less than the reference values for some reason, for example, dust or change with time of the sensors etc., an alarm is given to indicate that a problem might have arisen (S 18). If operation is determined to be normal, the procedure moves to the next step.

S 19: With respect to the detected data $L_A$ and $L_B$ $$L_c=L_B-S_A$$

is computed and the analogue switch 14 is operated to select one of the resistors $R_{10}$ to $R_{n0}$ to bring the amplification factor into accordance with the reference value (for example, the difference of the output level between the interrupted and non-interrupted conditions in cases where the amplification factor is set to the minimum in normal condition) while comparing the resulting value $L_c$ and the reference value.

S 20: The system is switched to the "bright" condition (signal level for carrying out normal detection) by connecting the light emitting diode 6 to the power source Vcc via the resistor $R_1$ with the control signal TA again output.

S 21: The adjusting operation is completed and a ready condition is assumed for discrimination of the bills.

A detailed explanation of the discrimination operation is omitted herein since it does not directly relate to the gist of the present invention. However, it can be easily understood that many kinds of discriminating operations such as on whether a bill has or a bill watermark has passed can be carried out by having the light emitting diode 6 emit light in the "bright" condition and also by utilizing the value of $L_2$ obtained at the step S 8 as a threshold.

Additionally, the conditions for commencing the adjusting operation is not limited to the method of energizing the bill handling machine as shown in the first preferred embodiment; it is possible to perform adjustment by operating switches provided on an operation panel to provide adjusting operation instruments or a method of which utilizes a timer or the like to carry out adjustment at predetermined intervals.

A third preferred embodiment of the present invention will now be explained with reference to FIGS. 7 through 10.

Figure 7:
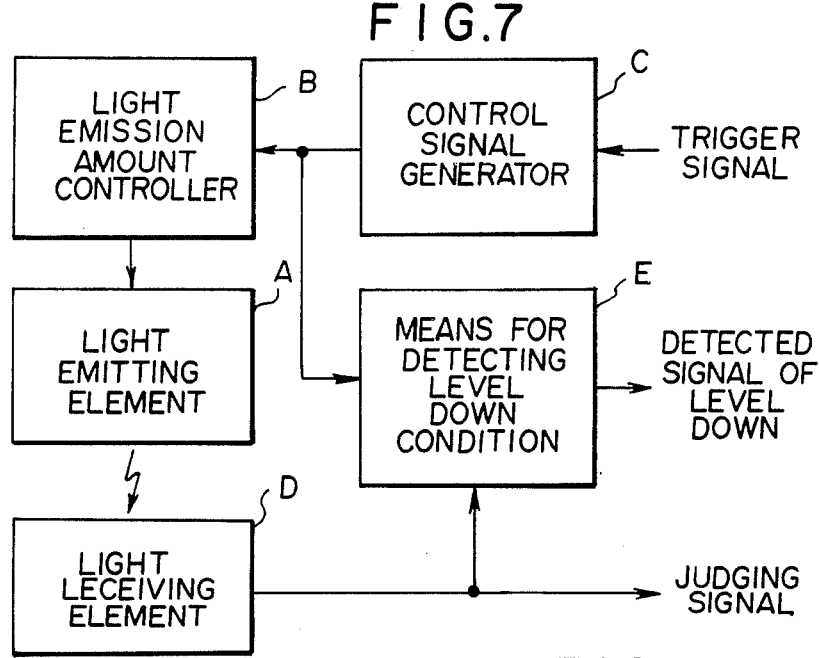
FIG. 7 is a block diagram showing a function of the apparatus according to a third preferred embodiment of the present invention.

In FIG. 7, a device according to the present invention comprises: a light emission amount controller B for switching the amount of light emission of light emitting element A to either of a "bright" mode and a "dark" mode; a control signal generator B for supplying said light emission amount controller B with a signal to switch said light emission amount controller B to either of the "bright" mode and "dark" mode; a light receiving element D for detecting the light emitted by said light emitting element A and converting it to an electric signal; a means J for detecting a decreased level condition of the light receiving element to output an alarm signal when the light reception level of the light receiving element when the light emitting element is emitting the light in the "dark" mode condition becomes less than a reference level.

The light emission amount of the light emitting element A is set to the "dark" mode which gives a slightly higher light reception level than the interrupted condition by operating the light emission amount controller B based upon the output signal from the control signal generator C. Accordingly, it is possible to confirm an abnormal optical sensor conditions by comparing the light reception level of the light receiving element under said light emitting conditions with the threshold as the light reception level in the "dark" mode becomes less than the threshold owing to dust or such like in the device.

Figure 9:
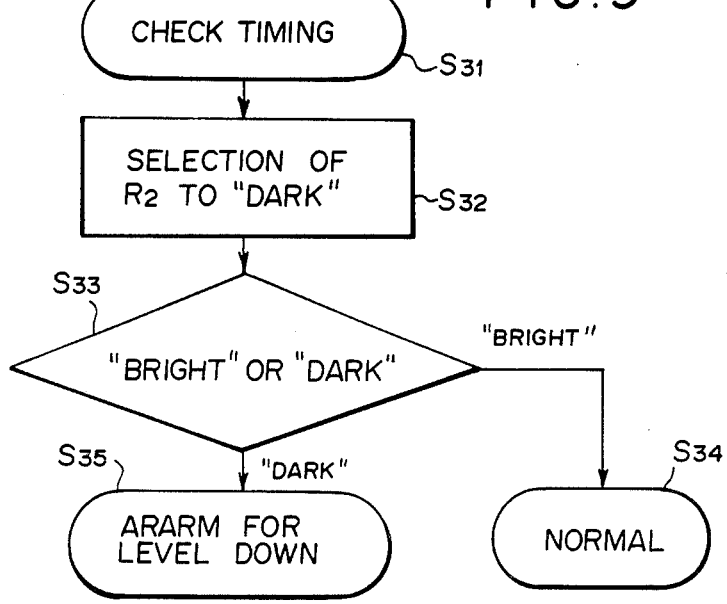
FIG. 9 is a flow chart showing an adjusting operation of the apparatus of FIG. 7.
Figure 8:
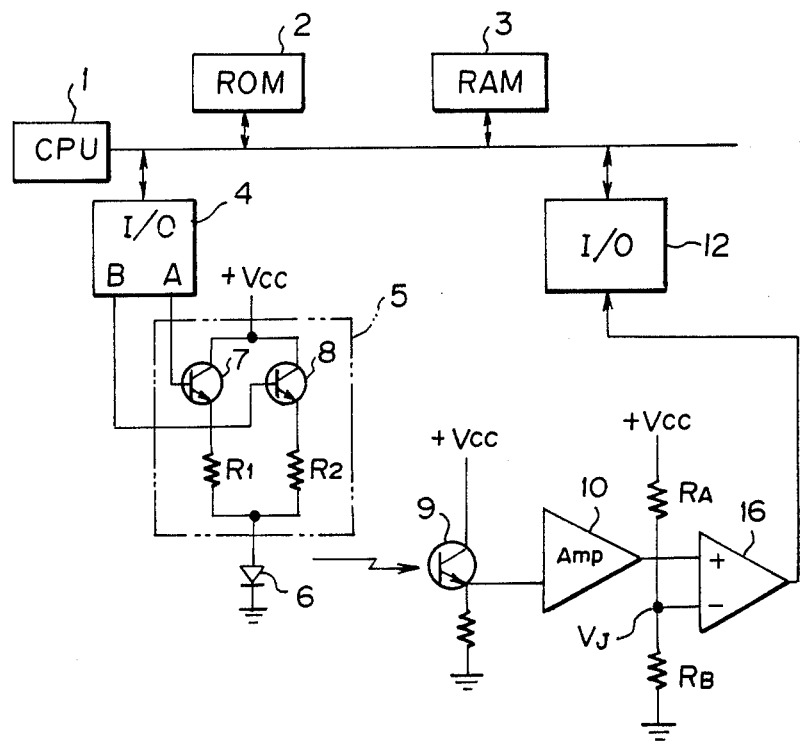
FIG. 8 is a block diagram showing a structure of the apparatus of FIG. 7.
Figure 10:
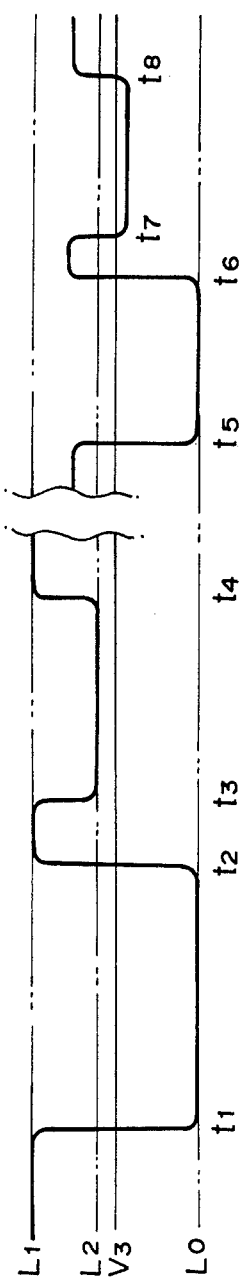
FIG. 10 is a diagram showing the characteristic waves of the light reception level of the apparatus of FIG. 7.

With reference to FIGS. 8 through 10, a numeral 1 denotes a CPU (central processing unit) for controlling a bill discrimination device and the like to which a ROM (read-only memory) 1 and RAM (random-access memory) 3 are connected. A light emission amount control circuit 5 is connected to the CPU 1 through an I/O (input/output) port 4 and a light emitting element, i.e. a light emitting diode 6, is connected to the light emission amount controlling circuit 5.

The light emission amount control circuit 5 consists of a control transistor 7 triggered by an "A" signal output from the I/O port 4 and a control transistor 8 triggered by a "B" signal are arranged in parallel. The control transistors 7 and 8 are connected to the light emitting diode 6 via resistors $R_1$ and $R_2$ respectively. The value of the resistor $R_1$ is set at such a level that the output level of the phototransistor 9 is such part the light-emitting diode 6 emits an amount of hight in the "bright" mode which is equivalent to the light being detected directly (i.e. in the non-interrupted condition). On the other hand, the value of the resistor $R_2$ is set at such a level that the output level from the phototransistor 9 is such that the light-emitting diode 6 emits an amount of light in the "dark" mode which is equivalent to the incident light on the phototransistor 9 reduced by the interposing of a bill or the like (i.e. in the interrupted condition).

The phototransistor 9 is arranged at a position where it can receive the light emitted from the light emitting diode 6. The output of the phototransistor 9 is input to a positive input terminal of a comparator 16 via an amplifier 10. A negative input terminal of the comparator 16 is connected to power source Vcc via resistor $R_A$ and is also connected to ground through a resistor $R_B$. Accordingly, the result of a comparison of a reference voltage $V_j$ (threshold) which is defined by the resistors $R_A$ and $R_B$ and the power source voltage Vcc as $$V_j = Vcc \times R_B/(R_A+R_B)$$

with the output level of the amplifier 10 is converted to a digital signal which is easily processed by the CPU 1 and is then input to the CPU 1 via the I/O port 12.

The operation of the circuit in FIG. 8 will now be explained with reference to the flow chart in FIG. 9. In these explanations, S n denotes the nth step in the flow chart.

S 31: The adjusting operation is started by energizing (switching on the power source of) the bill receiving and discharging machine on which the optical sensors are provided, or by starting the check timing by manual operation of the switches provided on the apparatus.

S 32: The light emitting diode 6 is energized through the control transistor 8 and the resistor $R_2$ and emits the light in the "dark" mode condition when the trigger signal B is output.

S 33: Determination is "normal" when the light reception level of the light receiving element 9 set in step S 32 exceeds the level $V_j$ and is determined as "bright". The "normal" determination, is followed by step S 34 after the light emitting diode 6 is switched to the "bright" light emission amount of. The light emission level or the light reception level is determined to be abnormal when it is determined as "dark" whereupon the alarm signal signifying a decreased level is generated, to operate an alarm display or other such alarm device (S 35).

That is, when the operation of the light emitting diode 6 and the photo transistor 9 is "normal", the light reception level $L_1$ in "bright" mode is obtainable in the non-interrupted condition (e.g. section $t_2$ to $t_3$ of FIG. 10) and the light reception level $L_2$ in "dark" mode is also obtainable in the non-interrupted condition (e.g. section $t_3$ to $t_4$ of FIG. 10). However, when a bill or the like produces an interrupted condition, the light reception level $L_0$ is obtainable (e.g. section $t_1$ to $t_2$ of FIG. 10). For abnormal conditions, it is possible to determine abnormal condition since the light reception level in "dark" mode when the device is started becomes less than the reference value (threshold) $V_j$ as shown by section $t_7$ to $t_3$ in FIG. 10.

A detailed explanation of the discrimination operation is omitted herein since it does not directly relate to the gist of the present invention. However, it can be easily understood that many kinds of discriminating operations such as on whether a bill has or a bill watermark has passed can be carried out by having the light emitting diode 6 emit light in the "bright" condition.

As can be understood from the above explanation with reference to the first preferred embodiment, since the device of the present invention is so constructed that the light receiving element generates a detecting signal of the same level in the interrupted and non-interrupted conditions by changing the light emission amuont of the light emitting element of the optical sensor and a new threshold is set by computing the resultant light reception level data, it is possible to carry out the discrimination operation by utilizing an optimum threshold regardless of the change with time of each element and the presence of dust, etc.

Also, as shown in the second preferred embodiment of the present invention which comprises: a light emission amount controller for changing the light emission level of the light emitting element; a control signal generator for supplying the light emission amount controller with a plurality of control signals each of which triggers a change in the light emission level of the light emitting element; a light receiving element for detecting the light emitted from the light emitting element and for converting it to an electric signal; an amplifier for amplifying an output signal of said light receiving element; an amplifier controller for controlling the amplification factor of the amplifier; an amplification factor determining means for computing the relative difference of the signals output from said amplifier and controlling said amplifier controller so that the result of the computation conforms to a reference value every time one of the plurality of control signals is output from said control signal generator. Such a construction, accordingly, makes it possible to carry out the discrimination operation by maintaining an optimum threshold regardless of changes with time of the light emitting and receiving elements and the presence of dust thereon.

Also, as shown in the third preferred embodiment of the present invention, since the device of the present invention is so constructed that the light emission amount of the light emitting element can be switched to a "bright" or "dark" mode by the light emission amount controller and an alarm signal is output by a level drop detecting means when the light reception level of the light receiving element when the light emitting element is in the "dark" mode becomes less than a reference value, and when the light emitting element is operated by the light emission amount controller so that a light reception level that is slightly higher than it is in the interrupted condition is obtainable so as to compare the light reception level in this light emitting condition with the threshold, it is possible to prevent malfunctioning of the device which is often caused by the change with time of light emitting and receiving elements and the presence of dust, etc. without using the dummy sensors used in the adjusting device of the prior art.

What we claim is:

1. A device for adjusting optical sensors in which light from a light emitting element is detected by a light receiving element to determine whether the output level of said light receiving element exceeds a threshold comprising: a controlling means for changing the amount of light emission of said light emitting element; a control signal generating means for supplying said light emission amount controlling means with a plurality of control signals for changing the light emission level of said light emitting element; a reference level memorizing means for storing, every time when the plurality of control signals are supplied, the output signal from said light receiving element on outputting of each control signal; and, a comparative level computing and memorizing means for computing a comparative level from the plurality of output signals stored in said reference level memorizing means and storing the comparative level as a threshold of said light receiving element.

2. A device for adjusting optical sensors in which light from a light emitting element is detected by a light receiving element to determine whether the output level of said light receiving element exceeds a threshold comprising: a contolling means for changing the amount of light emission of said light emitting element; a control signal generating means for supplying said light emission amount controlling means with a plurality of control signals for changing the light emission level of said light emitting element a light receiving element for detecting the light emitted from said light emitting element and converting it to an electric signal, an amplifier for amplifying the output signal of said light receiving element, an amplifier controlling means for controlling the amplification factor of said amplifier, and amplification factor determining means for computing a relative relationship between signals output from said amplifier and controlling said amplifier controlling means in order to bring the result of the computation into accord with a reference value when control signals are output from said control signal generating means.

3. A device for adjusting optical sensors in which light from a light emitting element is detected by a light receiving element to determine whether the output level of said light receiving element exceeds a threshold comprising: a light emission amount controlling means for switching the amount of light emission of said light emitting element to a "bright" mode or a "dark" mode; a control signal generating means for supplying said light emission amount controlling means with a signal to switch said light emission amount controlling means to the "bright" mode or the "dark" mode; a means for detecting a decreased level condition of the light receiving element to output an alarm signal when the light reception level compared with a reference value and is less than the reference level when the light emitting element is emitting the light in the "dark" mode condition, said light emission amount in the "dark" mode condition being so set that said light receiving element can output in non-interruped condition a light reception level exceeding said threshold, said reference level in said decreased level detecting means being brought into conformity with said threshold.

* * * * *